United States Patent [19]

Farnham

[11] Patent Number: 5,148,828
[45] Date of Patent: Sep. 22, 1992

[54] CHECK VALVE ASSEMBLY

[75] Inventor: Scott C. Farnham, Peru, Ind.

[73] Assignee: The Ford Meter Box Co., Inc., Wabash, Ind.

[21] Appl. No.: 677,098

[22] Filed: Mar. 29, 1991

[51] Int. Cl.$^5$ .............................................. F16K 15/06
[52] U.S. Cl. .................. 137/454.6; 137/512; 137/542
[58] Field of Search ............... 137/218, 454.6, 512, 137/542

[56] References Cited

U.S. PATENT DOCUMENTS

| 181,168 | 8/1876 | Hill | 137/454.6 |
|---|---|---|---|
| 1,628,069 | 5/1927 | Schmidt | 137/454.6 |
| 1,953,007 | 3/1934 | Farmer | 137/454.6 |
| 4,039,003 | 8/1977 | Cheek | 137/454.6 X |
| 4,936,339 | 6/1990 | Bennett | 137/454.6 |

OTHER PUBLICATIONS

"Ford Shines New Light On Residential Backflow Protection," Ford Meter Box Co. Brochure. (undated).

Primary Examiner—Robert G. Nilson
Attorney, Agent, or Firm—Barnes & Thornburg

[57] ABSTRACT

An angled check valve assembly having a housing with inlet and outlet passageways angled with respect to each other, and a spider spacer cage at a location which allows flow through the inlet passageway into the spider spacer cage where the flow is then angled and directed through the outlet passageway. One of the passageways has one-way check valve(s) therein to insure one-way flow from the inlet through the outlet passage. An installation entry is provided in the housing for insertion of the check valve(s). The installation entry is sealingly closed by a threaded closure member. The spider spacer cage is rotatable relative to the threaded closure so that, as the closure member is moved inwardly, at least one opening (in the side of spider spacer cage) can be kept in registry with one of the passageways. The spider spacer cage also forces the one-way valve(s) toward an abutment in the housing. The spider spacer cage is indexed to one end of the one-way valve(s), and the valve(s) are indexed to each other and/or the housing, to prevent the closure from moving axially to seal the entry when the one-way valve is inserted upside down so as to prevent flow from the inlet through to the outlet.

29 Claims, 2 Drawing Sheets

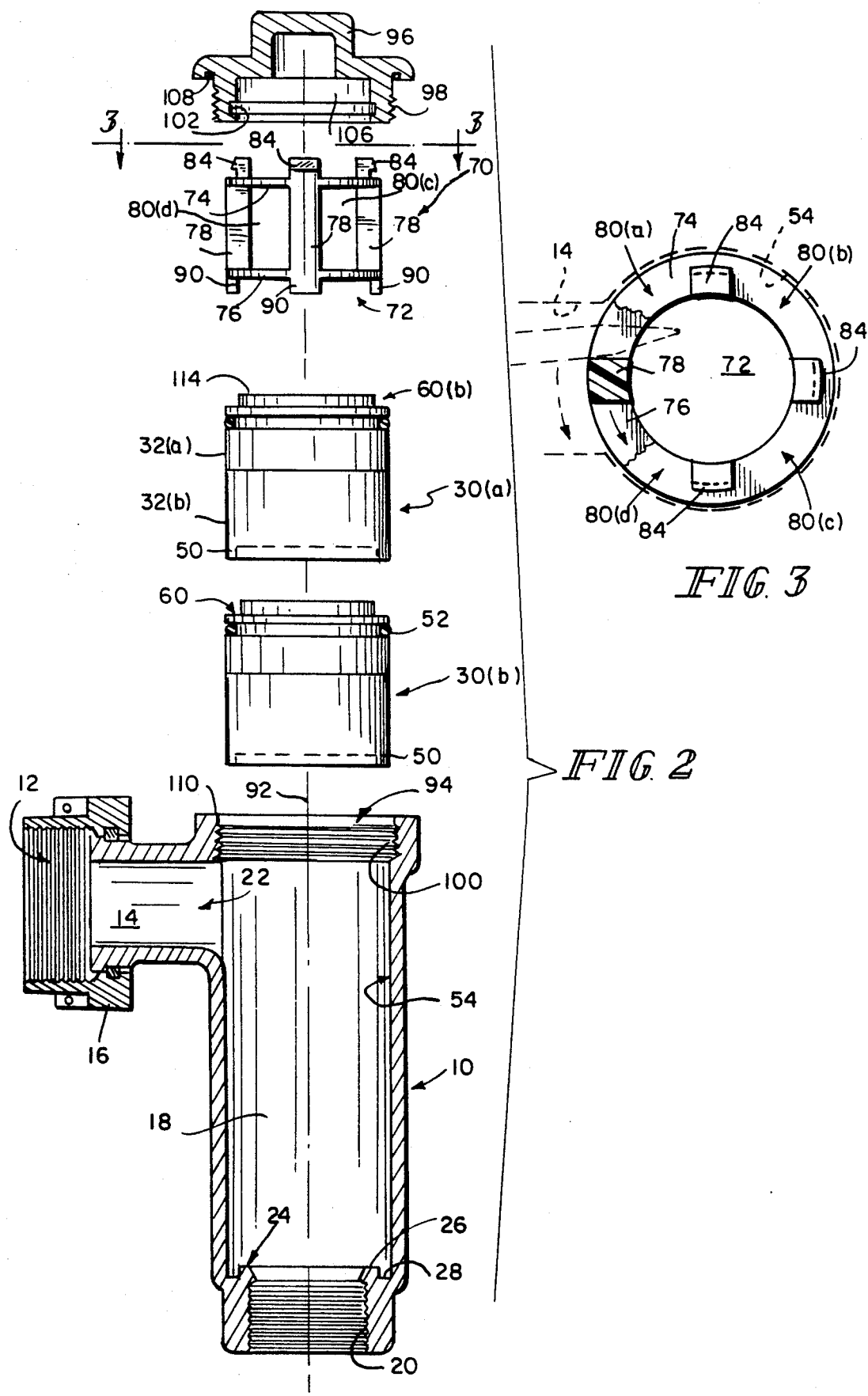

CHECK VALVE ASSEMBLY

BACKGROUND AND SUMMARY OF THE INVENTION

This invention relates to a check valve assembly which includes certain features for insuring proper orientation of one or more check valve elements in a flow line, and for permitting proper orientation of a spider spacer element located between the check valve(s) and an inlet passageway of the check valve assembly.

In drinking water systems, many municipalities require some mechanism to insure against backflow from end user installations into the potable water supply. When water pressure in the potable water system is unusually low, or if high pressure occurs at end user locations, reverse flow from the end user area into the potable water system is possible. This reverse flow can contaminate the water supply. In areas where pesticides and herbicides are commonly used, as well as in other areas in which environmentally dangerous chemicals are found, the existence of back flow conditions may pose special contamination risks. Back flow prevention devices are usually placed in a water line at or near the point where an individual service connection taps into the common supply line. In this manner, contaminates present at the point of use are kept separated from the potable supply source of water. This is normally accomplished by placing a one-way check valve in the water line to stop reverse flow and provide anti-syphoning control when water pressure in the potable water system gets too low.

Applicant previously developed a right angle check valve assembly wherein plural check valves are provided. Applicant's prior art system incorporates a dual check valve system in a right-angled pipe housing. Two one-way check valve units are inserted into a passageway of the right-angled pipe through a screw closure mechanism which is aligned with a flow axis of the passageway. The closure mechanism includes an integral spider spacer cage which extends outwardly from threads which are used to hold the closure mechanism to the pipe housing. After the one-way valve(s) are inserted into the passageway, the closure mechanism is threaded into the angled pipe housing to seal the passageway. The spider spacer cage is located at a juncture of the inlet passageway and the vertical outlet passageway of the assembly. Water (or another fluid) flows into the assembly through the inlet passageway, passes through the spider spacer cage and the check valves, and then exits through the outlet passageway of the assembly.

It is an object of the instant invention to improve upon Applicant's prior art assembly by providing flow enhancing modifications and safety features to insure correct orientation of the spider spacer cage and correct orientation of the one-way valve units in the system.

In the prior art systems the valve housing and closure are often made of bronze or other metal castings. The spider spacer cage is cast integral with the closure. As the closure is screwed into the housing, ports inside of the spider spacer cage did not always align themselves with the inlet passageway, thus causing a restricted flow through the system.

In order to improve the flow through the system, the instant invention contemplates making the spider spacer cage out of a plastic material and attaching it to the cast closure member by a snap-in fit which allows for relative rotation between the spider spacer cage and the closure member. In particular, the closure has an internal groove to which the spider spacer cage is attached by way of wedges on upper extending legs of the spider spacer cage. These wedges can ride in the grooves to allow for relative rotation of the spider spacer cage and the closure member, while at the same time, rotation of the rotatable closure member causes axial movement of the spider spacer cage. As the closure is rotated to close and seal the entry to the check valve assembly, the spider cage is forced downward to press against the one-way valve units in a manner to be discussed below. When (or as) the closure is completely tightened, a tool can be inserted into the inlet passageway and through a side opening in the spider spacer cage so as to be able to rotate the spider spacer cage to a position where the opening is aligned with the inlet passage. In this manner, the flow restrictive nature of the spider spacer cage is minimized.

It is another object of the invention to provide a safety feature to insure that the one-way valve(s) are inserted in the proper direction, which direction only permits flow from the inlet passageway through the outlet passageway and prohibits reverse flow or syphoning from the outlet passageway into the inlet passageway whereby contamination of the source of water could occur.

To this end, the check valve assembly is provided with an abutment at the bottom-most end of the outlet passageway. This abutment defines the lowest level of insertion for the one-way valve units. An indexing connection is provided between the one-way valve units and the abutment and the spider spacer cage which allows the valve units to telescope over each other and the abutment and the spider spacer cage to telescope over the inlet end of one of the one-way valve units. The index connection prevents telescoping when one of the one-way valve units is oriented in an improper direction, preventing complete closure of the assembly and indicating the improper orientation.

In the double valve unit failsafe system, two one-way valve units are placed in the outlet passage, one atop the other. Here the inlet end of the lower valve unit is indexed to the outlet end of the upper valve unit so that the lower end of the upper valve can telescope over the inlet end of the lower valve unit. Similarly, a lower end of the lower valve unit is indexed with an abutment at the outlet end of the outlet passageway to allow for a telescoping of the lower valve unit into the abutment. The spider spacer cage is indexed for telescoping over the inlet end of the upper valve unit.

If either, or both, of the valve units are inserted in the reverse direction, all of the aforementioned telescoping relationships cannot occur since the indexing cannot take place when a bottom of the valve unit abuts either a bottom of the spider spacer cage or the inlet of the other valve unit, or if the inlet of a valve unit abuts the abutment at the bottom of the outlet passage.

The distance between the entry closure means and the abutment is such that the telescopic overlapping of the spider spacer cage, the one-way valve(s) and the abutment must each occur, or else the stacking of the spider spacer cage and the valve unit(s) will cause their length in the outlet passage to exceed that distance which would permit the closure means from reaching a closed position. When the valve unit(s) are properly aligned to permit flow from the inlet passageway to the outlet passageway, their length is such that the spider spacer cage can telescope over a valve unit as the closure is rotated to close off and seal the entry while it axially moves the spider spacer cage downwardly.

Other objects, advantages and novel features of the present invention will become apparent from the following detailed description of the invention when considered in conjunction with the accompanying drawings.

BRIEF DESCRIPTION OF THE DRAWINGS

FIG. 2 is an exploded view of the valve assembly with the valve housing in section and the valve units and spider spacer cage in full view; and FIG. 3 is a plan view of the spider spacer taken along the line 3—3 of FIG. 2.

DETAILED DESCRIPTION OF THE DRAWINGS

Figure 1:
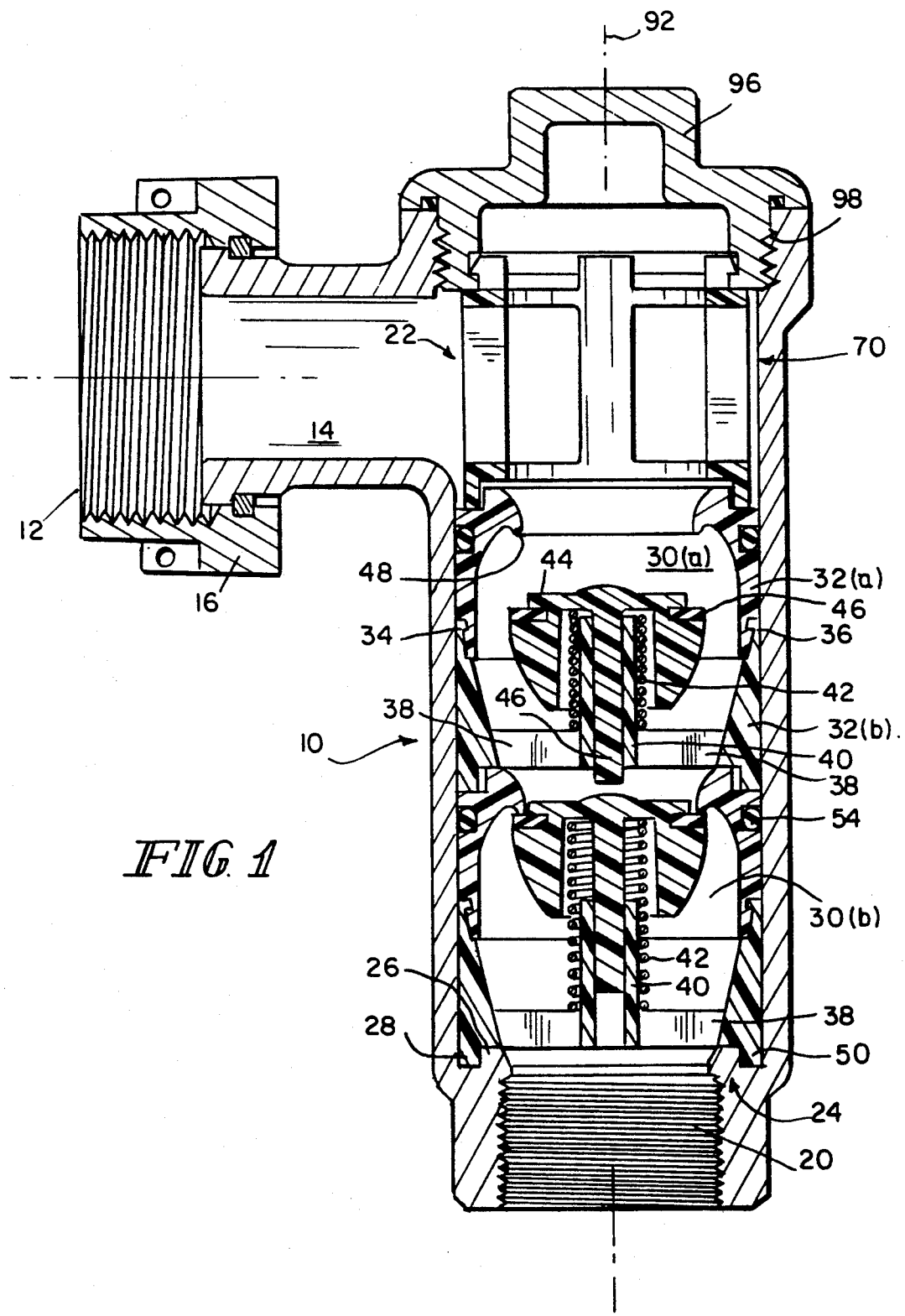
FIG. 1 is a cross-sectional view of the valve assembly.

The drawings show a valve housing 10 consisting of a right angle pipe connection having an inlet 12 and inlet passageway 14. The inlet is adapted to be connected to a water meter (not shown) of a municipality water system (not shown) through coupler 16. The housing also is provided with an outlet passageway 18 which terminates at a threaded outlet 20 which is adapted to be connected to a water user location such as a residential water system terminating at a faucet, water sprinkler, irrigation system, etc (not shown). The inlet and outlet passageways 14 and 18 are fluidly connected to each other at junction 22 at the upper end of outlet passageway 18.

The housing is provided with an abutment shoulder 24 located at the lower bottom area of the outlet passageway 18. The abutment shoulder is defined by a central raised portion 26 and a circular recess 28 extending circumferentially to the outside of the raised portion 26. The raised portion 26 and recess 28 act as an indexing mechanism as will be explained below.

Located within the outlet passageway 18 are two identical one-way valve units 30(a) and 30(b). As both valve units are the same only the details of valve unit 30(a) will be discussed further. The valve unit 30(a) has a two piece 32(a), 32(b) casing which is snapped together internally by a recess on inner lip 34 of piece 32(a) engaging a projection 36 on outer piece 32(b) as the two pieces 32(a), 32(b) are telescoped into one another. The lower piece 32(b) has radial spider arms 38 which support an integrally formed hollow valve shaft support spindle 40 as well as compression spring 42. For ease in understanding, FIG. 1 shows the compression spring of the upper valve unit 30(a) collapsed as occurs when the valve unit is in an open position, while the lower valve unit 30(b) is shown with the compression spring elongated and the valve unit closed. In normal operation both valves would be in the same condition, i.e., opened or closed. A valve element 44 has its stem 46 slidable in the hollow valve shaft support spindle 40 and is biased upwardly by the spring 42 contacting an underside of the valve element 44. The valve element 44 has a gasket 46 which abuts and seals valve seat 48 formed in the upper piece 32(a). When the pressure of the water system at the inlet 12 is greater than the pressure at the outlet 20 (i.e. when the user is attempting to withdraw water and the water system has sufficient head) the valve element 44 will be forced downward against spring 42 by the pressure of the water supply to open the outlet passageway 18 through seat 48 to permit water flow through the valves 30(a), 30(b).

The bottom of each valve unit 30(a), 30(b) has a raised circular ridge 50 which mates with the circular recess 28 at the abutment 24 at the bottom of the outlet passageway 18 to permit the lower valve unit 30(b) to telescope over the raised portion 26 of the abutment 24. An O-ring 52 is carried in a groove 56 in the upper portion 32(a) of the valve units 30(a), 30(b) to sealingly engage the inner wall 54 of the outlet passageway 18. These O-rings 52 insure that no water flow is allowed around the outside of the valve units 30(a), 30(b). The upper side of the valve units 30(a), 30(b) also have an indexing mechanism comprising a circular recess 60 which is the same diameter and size as the recess 28 of the abutment 24 at the outlet 20 of the outlet passageway 18. This permits the two valve units 30(a), 30(b) to be stacked, one upon the other, in a telescopic fashion with the lower circular ridge 50 of the upper valve unit 30(a) resting in the recess 60 on the top of the lower valve unit 30(b).

A circular hollow plastic spider spacer cage 70 is located in the outlet passageway 18, atop the upper valve unit 30(a). Spider spacer cage 70 has a hollow interior area 72 defined by an upper circular ring 74 and a lower circular ring 76 which are connected to one another by four identical vertical legs 78. The legs 78 extend above the upper ring 74 and below the lower circular ring 76. Openings 80(a)(b)(c)(d) extend between the vertical legs 78 and the two rings 74, 76 to allow flow of water from inlet passageway 14 to pass through one of the openings 80(a)(b)(c)(d) into the hollow interior area 72 and from there downwardly to the upper valve unit 30(a).

The upper ends of the vertical legs 78 have wedges 84 extending outwardly from the center area 72 for a purpose to be explained later. The spider spacer cage 70 is preferably made from a flexible plastic as a unitary (molded) piece. The lower ends 90 of legs 78 extend downward to rest in recess 60(b) of the upper valve unit 30(a). These lower ends 90 have concentrically curved inwardly and outwardly facing edges with respect to the center line 92 of the outlet passageway 18 so that they can freely slide in the recess 60(b) of the upper valve unit 30(a).

An installation entry 94 is provided at the top of the outlet passageway 18 of housing 10 to allow for insertion and removal of the valve units 30(a) and 30(b) into the outlet passageway. A closure member 96 is provided with external threads 98 which mate with threads 100 at the installation entry 94. A circular recess 102 is located internally of the closure 96 and receives the wedges 84 from the upper ends of the legs 78 of the spider spacer cage 70 in a snap lock fashion. That is, since the spider is made from flexible plastic, it can be inserted upwardly into the hollow bottom interior 106 of the closure 96 with the upper portion of the legs 78 being flexed inwardly until the wedges 84 reach the location of the recess 102 at which point the legs will straighten out and the wedges 84 flexed back to lie in the recess 102. This flexed connection allows for the spider spacer cage 70 to have a snap connection to the closure 96 whereby the axial distance between the closure 96 and the spider spacer cage 70 is fixed by the snap action, while the connection between wedges 84 and recess 102 allows for relative rotation between the closure 96 and the spider spacer cage 70. When the closure is screwed onto the threads 100 at entry 94, it will move downward as threads 98, 100 cooperate to force the spider spacer cage 70 downwardly to the point where the bottom ends 90 of legs 78 of the spider spacer cage 70 telescope into recess 60(b) of the top valve unit 30(a). An O-ring 108 on the closure cooperates with the housing top 110 to seal the entry 94. After sealing of closure 96, or while closure 96 is being threaded into the sealed position, a tool (not shown) can be inserted through opening 12 to engage a side of one of the legs 78 to rotate spider spacer cage 70 with respect to closure 96 to align one opening 80(a)(b)(c)(d) with inlet passageway 14 to reduce any obstruction occurring when a leg 78 covers a portion of inlet passageway 14. In the prior art, the spider spacer cage is an integral casting with closure 96 and hence such a relative rotation between spider spacer cage 70 and closure 96 is not possible.

Valve units 30(a), 30(b) are inserted into the outlet passageway through entry 94. If bottom valve unit 30(b) is inserted upside down so as to block flow from the inlet passageway 14 through the outlet passageway 18, its upper surface 114 will abut raised portion 26 of abutment 24 at the bottom end of the outlet passage 18 and will not allow the bottom valve unit 30(b) to telescope over the raised portion 26 of abutment 24. This will cause upper valve unit 30(a) to also be raised in the outlet passageway (regardless of its proper orientation). Thus when lower portion 90 of legs 78 of the spider cage engage recess 60(b) of the upper side of the upper valve unit 30(a) (assuming valve unit 30 to be oriented properly when inserted) spider spacer cage 70 will not be allowed to drop downwardly a sufficient distance to permit threads 98 of closure 96 to engage entry threads 100. This will indicate to the assembler that at least one of the valve units has been inserted in a reverse flow (upside down position). This occurs because the height distance taken up by the two valve units 30(a), 30(b) and spider spacer cage 70 is just enough to allow the closure to be screwed on tightly when the lower ends 90 of the spider spacer cage 70 telescopically rests in the recess 60(b) of the upper valve unit 30(a), the circular ridge 50 of the upper valve unit 30(a) telescopically rests in the recess 60 of the lower valve unit 30(b), and the circular ridge 50 of the lower valve unit 30(b) telescopically rests in recess 28 at the abutment 24 at the lower end of the outlet passageway 18.

If both valve units 30(a), 30(b) are inserted in a flow reverse direction (upside down) they can telescope together but the lower valve unit 30(b) cannot telescope into recess 28 at the abutment 24 at the lower end of the outlet passageway 18. Also the bottom ends 90 of the spider spacer cage 70 legs 78 cannot telescope into recess 60(b) of the upper valve unit 30(a) since the valve unit 30(a) is inverted and hence ridge 50 of the upper valve unit will contact ends 90 of legs 78 of the spider spacer cage 70. Threads 98 of closure 96 cannot engage threads 100, providing a warning to the installer that at least one valve unit 30(a), 30(b) is inserted in a flow reverse direction (upside down).

Likewise, if only the upper valve unit 30(a) is inserted in a reverse flow direction, its two ends cannot telescopically mate with the lower valve unit 30(b) and the spider spacer cage 70, which situation again prevents threads 98 of closure 96 from engaging threads 100, and thus indicates to the installer that at least one of the valve units 30(a), 30(b) is installed in a reverse flow direction (i.e., upside down).

Thus it can be seen that the length of the spider spacer cage 70 and the valve units 30(a), 30(b) (when telescoped together) must coincide closely to the distance between closure 96 and abutment 24 when closure 96 is in its closed and sealed condition in order for the safety indexing system to indicate improper insertion of a valve unit 30(a), 30(b).

While the drawings show a failsafe double valve unit, the invention contemplates the use of a single valve unit. In such a case, the outlet passage 18 could be shortened to provide the desired indication upon improper reverse flow insertion of the single valve unit. Alternatively, the casing of the single valve unit could be made twice as long (to equal the length of the two single valve units shown) to prohibit closure upon reverse insertion of the valve. Other methods to allow use of a single valve unit may include use of a second spacer unit, or a longer spider spacer cage to provide the required distance to prohibit closure thread engagement upon reverse orientation of the valve.

The present invention also contemplates that the relative positions of the inlet and outlet, as described and referred to in connection with the specific embodiment shown in the drawings, may be reversed. However, as in the embodiment shown, the spider spacer cage is preferably located at the "90° end" of the assembly and is preferably attached to a closure device. Furthermore, certain aspects of the invention, such as the provision of an indication of improper installation of the check valve elements, may be applicable to other types of check valve assemblies, as well.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An angled check valve assembly, comprising:
   a pipe housing means having an inlet passageway therein for connection to a fluid supply inlet and an outlet passageway connected to and angled to the inlet passageway to provide an exit outlet which directs fluid from the supply inlet at an angle with respect to its inlet direction;
   check valve means, comprising plural checks valve assemblies, each having an outer casing dimensioned to be received in one of the passageways, for preventing reverse flow from the outlet to the inlet;
   an installation entry in the pipe housing means to allow for passage of the check valve means into the one passageway of the pipe housing means;
   a closure means for fluidly closing and sealing the installation entry;
   a spider spacer cage means located between the closure means and the check valve means at a point where the two angled passageways intersect for providing an open passageway for liquid flow from the inlet passageway to be angled to the outlet passageway;
   the spider spacer cage means having at least one opening in a side wall thereof aligned with one passageway and a second opening in an end thereof aligned with the outer passageway;
   said spacer means being formed as a separate element from the closure means and being rotatable with respect thereto so as to allow the at least one opening to be aligned with said one passageway.

2. The angled check valve of claim 1, wherein the spider spacer cage is physically attached to the closure means so as to be axially movable therewith; and wherein the closure means is axially movable with respect to the entry to close the entry.

3. The angled check valve of claim 2, further comprising positioning means in the one passageway for preventing the closure means from closing and sealing the installation entry if the check valve means is improperly installed in the passageway.

4. The angled check valve of claim 1, further comprising positioning means in the one passageway for preventing the closure means from closing and sealing the installation entry if the check valve means is improperly installed in the passageway.

5. The angled check valve of claim 3, wherein said positioning means limits axial movement of the spider spacer cage means to a fully inserted position to prevent the closure means from closing and sealing the installation entry when the valve means is inserted upside down in the one passageway such that it would prevent flow from the inlet passageway through the outlet passageway.

6. The angled check valve of claim 4, wherein said positioning means limits axial movement of the spider spacer cage means to a fully inserted position to prevent the closure means from closing and sealing the installation entry when the valve means is inserted upside down in the one passageway such that it would prevent flow from the inlet passageway through the outlet passageway.

7. The angled check valve of claim 5, wherein said positioning means comprises index means on at least one of the pipe housing means, the valve means, and the spider spacer cage means, said index means comprising a recess formed in at least one of said means that cooperates with an extension formed on another of said means.

8. The angled check valve of claim 6, wherein said positioning means comprises index means on at least one of the pipe housing means, the valve means, and the spider spacer cage means, said index means comprising a recess formed in at least one of said means that cooperates with an extension formed on another of said means.

9. The angled check valve of claim 5, wherein the valve means are plural stacked check valve units, and further comprising index means between the two stacked units for causing the stacked units to prevent the closure means from axially moving to close and seal the entry when any one of the plural stack valve units is inserted upside down to prohibit flow from the inlet passageway through the outlet passageway.

10. The angled check valve of claim 6, wherein the valve means are plural stacked check valve units, and further comprising index means between the two stacked units for causing the stacked units to prevent the closure means from axially moving to close and seal the entry when any one of the plural stack valve units is inserted upside down to prohibit flow from the inlet passageway through the outlet passageway.

11. The angled check valve of claim 7, wherein the valve means are plural stacked check valve units, and further comprising second index means between the two stacked units for causing the stacked units to prevent the closure means from axially moving to close and seal the entry when any one of the plural stack valve units is inserted upside down to prohibit flow from the inlet passageway through the outlet passageway.

12. The angled check valve of claim 8, wherein the valve means are plural stacked check valve units, and further comprising second index means between the two stacked units for causing the stacked units to prevent the closure means for axially moving to close and seal the entry when any one of the plural stack valve units is inserted upside down to prohibit flow from the inlet passageway through the outlet passageway.

13. An angled check valve assembly, comprising:
a housing means having an inlet passageway therein for connection to a fluid supply inlet at one angle and an outlet passageway connected to and angled to the inlet passageway to provide an exit outlet which directs fluid from the supply inlet at an angle with respect to its inlet direction;
check valve means, comprising plural check valve assemblies, each having an outer casing dimensioned to be received in one of the passageways, for preventing reverse flow from the outlet to the inlet;
an installation entry in the housing means to allow for passage of the check valve means into the one passageway of the housing means;
closure means for fluidly closing and sealing the installation entry upon axial movement with respect thereto;
spider spacer cage means located between the closure means and the check valve means at a point where the two angled passageways intersect for providing an open passageway for liquid flow from the inlet passageway to the outlet passageway;
the spider spacer cage means having at least one opening in a side wall thereof to be aligned with one passageway and a second opening in an end thereof to be aligned with the other passageway;
wherein the spider spacer cage means moves axially with the closure means when the closure means is axially moved to close off and seal the entry;
and index means between respective ends of at least two of the valve means and the spider spacer cage means and the housing means for limiting the movement of the spider spacer cage means and the closure means so as to prevent the closure means from closing off and sealing the entry when one of the valve means is inserted upside down in the one passageway such that it would prevent flow from the inlet passageway through the outlet passageway.

14. The angled check valve of claim 13, wherein the index means comprises a recess on at least one of the housing means, the valve means, and the spider spacer cage means that cooperates with an adjacent extension on at least one of another of the housing means, the valve means, and the spider spacer means.

15. The angled check valve of claim 14, wherein the recess is circular so as to allow rotation of the spider spacer cage means such that its at least one opening can be aligned with said one passageway.

16. The angled check valve of claim 15, wherein the valve means are plural stacked check valve units, and further comprising second index means between the two stacked units for causing the stacked units to prevent the closure means from axially moving to close and seal the installation entry when any one of the plural stack valve units is inserted upside down to prohibit flow from the inlet passageway through the outlet passageway.

17. The angled check valve of claim 14, wherein the valve means are plural stacked check valve units, and further comprising second index means between the two stacked units for causing the stacked units to prevent the closure means from axially moving to close and seal the installation entry when any one of the plural stack valve units is inserted upside down to prohibit flow from the inlet passageway through the outlet passageway.

18. The angled check valve of claim 13, wherein the valve means are plural stacked check valve units, and further comprising second index means between the two stacked units for causing the stacked units to prevent the closure means from axially moving to close and seal the installation entry when any one of the plural stack valve units is inserted upside down to prohibit flow from the inlet passageway through the outlet passageway.

19. An angled check valve assembly comprising:
   a pipe housing means having an inlet passageway therein for connection to a fluid supply inlet at one angle and an outlet passageway connected to and angled to the inlet passageway to provide an exit outlet which directs fluid from the supply inlet at an angle with respect to its inlet direction;
   check valve means, comprising plural stacked check valve units, each having an outer casing dimensioned to be received in one of the passageways, for preventing reverse flow from the outlet to the inlet;
   an installation entry in the pipe conduit means to allow for passage of the check valve means into the pipe housing means;
   a closure means for fluidly closing and sealing the installation entry upon axial movement with respect thereto;
   a spider spacer cage means located between the closure means and the plural spaced check valve units at a point where the two angled passageways intersect for providing an open passageway for liquid flow from the inlet passageway to the outlet passageway;
   the spider spacer cage means having a caged configuration with at least one opening in a side wall thereof aligned with one passageway and a second opening in an end thereof to be aligned with the other passageway; and
   index means for preventing the closure means for axially moving to closure and seal the installation entry when any one of the plural stack valve units is inserted upside down to prohibit flow from the inlet passageway through the outlet passageway.

20. The angled check valve of claim 19, wherein the spider spacer cage is rotatable, relative to said closure means, to allow the opening in the sidewall to be aligned with the passageway when the closure means is installed in the installation entry.

21. The angled check valve of claim 19, wherein the spider spacer cage is formed of molded plastic and is attachable, by means of a snap fit, to the closure means.

22. A check valve assembly, comprising:
   housing means having an inlet and an outlet, and a passageway connecting the inlet and the outlet;
   check valve means in said passageway for limiting flow to one direction between the inlet and the outlet, said check valve means comprising plural valve units, each having an outer casing dimensioned to be received in the passageway in a predetermined operational orientation;
   an installation entry in the housing means to allow passage of the check valve means into said passageway;
   closure means for closing and sealing the installation entry; and
   means for preventing the closure means for closing and sealing the installation entry if the check valve means is improperly installed in the passageway in an orientation other than the predetermined operational orientation;
   wherein said closure means comprises a threaded cap and a spider spacer cage separately formed such that the spider spacer cage is rotatably movable, relative to the threaded cap; and
   wherein said spider cage has at least one opening in one side thereof and an opening in an end thereof, and wherein said spider spacer cage is positionable within said passageway when the closure means is installed so as to align the opening in the side with the inlet of the housing and the opening in the end with the check valve means.

23. A check valve assembly according to claim 22, wherein said means for preventing comprises a recess, formed in at least one of said housing means, said check valve means and said closure means, and an extension, formed on another of said means so as to be telescopingly received within said recess when the check valve means are properly installed in said passageway.

24. A check valve assembly, comprising:
   housing means having an inlet and an outlet, and a passageway connecting the inlet and the outlet;
   check valve means, comprising plural valve units, each having an outer casing dimensioned to received in said passageway for limiting flow to one direction between the inlet and the outlet;
   an installation entry in the housing means to allow passage of the check valve means into said passageway; and
   closure means for closing and sealing the installation entry;
   wherein said closure means comprises a cap and a spacer, and wherein said spacer is attachable to and is rotatably movable relative to said cap; and
   wherein said spacer has at least one opening in one side thereof and an opening in an end thereof, and wherein said spacer is rotatably positionable within said passageway when the closure means is installed so as to align the opening in the side with the inlet of the housing and the opening in the end with the check valve means.

25. A check valve assembly according to claim 24, wherein said spacer is formed of molded plastic and is attachable, by means of a snap fit, to the cap.

26. A check valve assembly according to claim 24, further comprising means for indicating improper installation of said check valve means in said passageway.

27. A check valve assembly according to claim 26, wherein said means for indicating comprises means for preventing the closure means from closing and sealing the installation entry if the check valve means is improperly installed in the passageway.

28. A check valve assembly according to claim 27, wherein said means for preventing comprises a recess, formed in at least one of said housing means, said check valve means and said closure means, and an extension, formed on another of said means so as to be telescopingly received within said recess when the check valves are properly installed in said passageway.

29. A check valve assembly, comprising:

housing means having an inlet and an outlet, and a passageway connecting the inlet and the outlet;

check valve means in said passageway for limiting flow to one direction between the inlet and the outlet, said check valve means comprising plural valve units, each having an outer casing dimensioned to be received in the passageway in a predetermined operational orientation;

an installation entry in the housing means to allow passage of the check valve means into said passageway;

closure means for closing and sealing the installation entry; and means for preventing the closure means for closing and sealing the installation entry if the check valve means is improperly installed in the passageway in an orientation other than the predetermined operational orientation;

wherein said closure means comprises a threaded cap and a spider spacer cage separately formed such that the spider spacer cage is rotatably movable, relative to the threaded cap; and wherein said spider spacer cage is formed of molded plastic and is attachable, by means of a snap fit, to the cap.

* * * * *